United States Patent [19]

Miller

[11] Patent Number: 5,716,593
[45] Date of Patent: Feb. 10, 1998

[54] PREPARATION OF Y-TYPE FAUJASITE USING AN ORGANIC TEMPLATE

[75] Inventor: Stephen J. Miller, San Francisco, Calif.

[73] Assignee: Chevron U.S.A. Inc., San Francisco, Calif.

[21] Appl. No.: 690,683

[22] Filed: Jul. 31, 1996

[51] Int. Cl.$^6$ .................................................. C01B 39/24
[52] U.S. Cl. ........................ 423/702; 423/704; 423/705; 423/706; 423/707; 423/708; 423/709; 423/713; 423/716; 423/DIG. 21; 502/66; 502/74; 502/79
[58] Field of Search ............................. 423/700, 702, 423/704, 705, 706, 707, 708, 709, 713, 716, DIG. 21; 502/79, 66, 74

[56] References Cited

U.S. PATENT DOCUMENTS

| | | | |
|---|---|---|---|
| 3,094,383 | 6/1963 | Dzierzanowski et al. | 423/701 |
| 3,119,659 | 1/1964 | Taggarf et al. | 423/710 |
| 3,777,006 | 12/1973 | Rundell et al. | 423/709 |
| 3,972,983 | 8/1976 | Ciric | 423/705 |
| 4,058,586 | 11/1977 | Chi et al. | 423/712 |
| 4,333,859 | 6/1982 | Vaughan | 423/DIG. 21 |
| 4,714,601 | 12/1987 | Vaughan | 423/707 |
| 4,879,103 | 11/1989 | Vaughan | 423/705 |
| 4,931,267 | 6/1990 | Vaughan et al. | 423/705 |
| 4,965,059 | 10/1990 | Vaughan | 423/707 |
| 5,098,686 | 3/1992 | Delprato et al. | 423/702 |
| 5,116,590 | 5/1992 | Vaughan et al. | 423/705 |
| 5,549,881 | 8/1996 | Vaughan et al. | 423/705 |
| 5,558,851 | 9/1996 | Miller | 423/716 |

FOREIGN PATENT DOCUMENTS

| | | |
|---|---|---|
| 2160517 | 12/1995 | United Kingdom . |
| WO92/12928 | 6/1994 | WIPO . |
| WO94/13584 | 6/1994 | WIPO . |

Primary Examiner—Mark L. Bell
Assistant Examiner—Louis M. Troilo
Attorney, Agent, or Firm—R. J. Sheridan

[57] ABSTRACT

A method is disclosed for preparing crystalline aluminosilicate Y-type faujasite from a reaction mixture containing an organic template capable of producing Y-type faujasite. The reaction mixture contains only sufficient water to produce Y-type faujasite. In one embodiment, the reaction mixture is self-supporting and may be shaped if desired. In the method, the reaction mixture is heated at crystallization conditions and in the absence of an added external liquid phase, so that excess liquid need not be removed from the crystallized product prior to drying the crystals.

29 Claims, No Drawings

PREPARATION OF Y-TYPE FAUJASITE USING AN ORGANIC TEMPLATE

FIELD OF THE INVENTION

The present invention relates to a process for producing crystalline aluminosilicate Y-type faujasite from a reaction mixture which contains an organic templating agent capable of producing Y-type faujasite and only sufficient water to form the Y-type faujasite.

BACKGROUND

Prior art methods of preparing crystalline Y zeolite typically produce finely divided crystals which must be separated from an excess of liquid in which the zeolite is crystallized. The liquid, in turn, must be treated for reuse or else be discarded, with potentially deleterious environmental consequences. Preparing commercially useful catalytic materials which contain the powdered zeolite also normally requires additional binding and forming steps. Typically, the zeolite powder as crystallized must be mixed with a binder material and then formed into shaped particles or agglomerates, using methods such as extruding, agglomeration, spray drying, and the like. These binding and forming steps greatly increase the complexity of catalyst manufacture involving zeolitic materials. The additional steps may also have an adverse effect on the catalytic performance of the Y zeolite so bound and formed.

U.S. Pat. No. 3,094,383, issued Jun. 18, 1963 to Dzierzanowski et al., discloses a method for making type A zeolites in the form of coherent polycrystalline aggregates by forming reaction masses consisting of a mixture of sodium aluminate, a siliceous material and water, wherein the $H_2O/Na_2O$ mole ratio is 5 to 25. The mass is aged while maintaining it out of contact with an external aqueous liquid phase while preventing the mass from dehydrating. The aging step can include maintaining the mass at 100° F. (38° C.) for, e.g., 18 hours, followed by heating at 200° F. (93° C.) for, e.g., 24 hours.

U.S. Pat. No. 3,119,659, issued Jan. 28, 1964 to Taggart et al., discloses a method for producing an aluminosilicate zeolite in a preformed body by providing an unreacted preformed body containing a reactive kaolin-type clay and alkali metal hydroxide, and reacting the preformed body in an aqueous reaction mixture until crystals of the zeolite are formed in the body. The aggregate of the preformed body and the aqueous reactant mixture has a $H_2O/Na_2O$ mole ratio of at least 20. It is stated that Y zeolite can be made in this manner.

U.S. Pat. No. 3,777,006, issued Dec. 4, 1973 to Rundell et al., discloses a process for preparing zeolitic bodies having a size in excess of 200 microns, by preparing clay bodies in the desired size range, treating the clay bodies in a sodium silicate solution, and heating the formed bodies in the solution until crystallization is complete. It is indicated that Y zeolite can be made in this manner.

U.S. Pat. No. 3,972,983, issued Aug. 3, 1976 to Ciric, discloses a faujasite-type zeolite designated ZSM-20 made by preparing a mixture containing sources of an alkali metal oxide, a tetraethylammonium oxide, an oxide of aluminum, an oxide of silicon and water and maintaining the mixture at a temperature of at least 50° C. until crystals of the zeolite are formed. The mole ratio of water to silica in the reaction mixture is disclosed to be 10–20.

U.S. Pat. No. 4,058,586, issued Nov. 15, 1977 to Chi et al., discloses a method for preparing zeolitic aluminosilicates, particularly those that are characterized by pores in the 4 to 10 Angstrom sizes that are designated Zeolites A and X, in which compacts of Zeolites A and X, metakaolin clay mixture undergo crystallization at a temperature of 200° to 700° F. (93° to 371° C.). The crystallization is carried out in a calciner or other drying equipment. Normally, the formed particles furnish all of the liquid needed for crystallization, though steam may be added during the crystallization process.

U.S. Pat. No. 4,931,267, issued Jun. 5, 1990 to Vaughan et al., discloses a faujasite polymorph designated ECR-32 having a silica to alumina ratio greater than 6, and containing tetrapropylammonium and/or tetrabutylammonium trapped in the supercages of the structure. The reaction mixture from which the material is made has a silica to alumina mole ratio of 9–36 and a water to alumina mole ratio of 120–500.

U.S. Pat. No. 5,116,590, issued May 26, 1992 to Vaughan et al., discloses a faujasite-type zeolite designated ECR-35 prepared from a reaction mixture which contains an organic cation selected from the group consisting of tetraethylammonium and methyltriethylammmonium or mixtures thereof. The reaction mixture from which the ECR-35 is prepared has a $Si/Al_2$ ratio of 8–30 and a $H_2O/Al_2O_3$ ratio of 100–600.

WO 92/12928, published Aug. 6, 1992, discloses that silica-bound extruded zeolites may be converted into binder-free zeolite aggregates by aging the zeolite in an aqueous ionic solution which contains hydroxy ions such that the initial molar ratio of $OH:SiO_2$ is up to 1.2 and which causes the silica binder to be converted substantially to zeolite of the type initially bound. It is stated that this process can be used to make Y zeolite.

WO 94/13584, published Jun. 23, 1994, discloses a method for preparing a crystalline aluminosilicate zeolite from a reaction mixture containing only sufficient water so that the reaction mixture may be shaped if desired. In the method, the reaction mixture is heated at crystallization conditions and in the absence of an external liquid phase, so that excess liquid need not be removed from the crystallized material prior to drying the crystals.

GB 2,160,517 A, published Dec. 24, 1985, relates to a preformed synthetic zeolite selected from the group consisting of Y, omega zeolite, offretite, erionite, L zeolite and ferrierite whose Si/Al atomic ratio ranges from 1.5 to 100, the preformed zeolite being obtained from a preformed aluminosilicic material whose Si/Al atomic ratio is lower than that of the product and ranges from 0.5 to 90 by treating the material with a silica-containing product in the presence of at least one organic or inorganic base.

SUMMARY OF THE INVENTION

It is an object of the invention to provide a method for preparing crystalline Y-type faujasite using a minimum of liquid for crystallization.

It is a further object of the invention to provide a method for preparing crystalline Y-type faujasite while minimizing aqueous waste.

It is a further object of the invention to provide a method for preparing Y-type faujasite in the absence of added binder.

It is also an object of this invention to prepare crystalline Y-type faujasite in the form of a shape.

It is a further object of the invention to provide a method for preparing Y-type faujasite in commercially useful forms without any post crystallization forming steps.

It is a further object of the invention to provide a method for preparing Y-type faujasite having a small crystallite size.

It is a further object of the invention to provide a method for preparing Y-type faujasite at reduced raw material costs.

Thus, in accordance with the present invention, there is provided a method for preparing crystalline Y-type faujasite, said method comprising preparing a reaction mixture comprising at least one active source of silica, at least one active source of alumina, and an organic templating agent capable of producing the Y-type faujasite in mounts sufficient to produce the Y-type faujasite, and sufficient water to produce the Y-type faujasite, and maintaining said reaction mixture at a temperature up to about 130° C. under crystallization conditions and in the absence of an added external liquid phase for sufficient time to form crystals of the Y-type faujasite.

The present invention also provides a method for preparing crystalline Y-type faujasite, said method comprising preparing a reaction mixture comprising at least one active source of silica, at least one active source of alumina, and an organic templating agent capable of producing the Y-type faujasite in amounts sufficient to produce the Y-type faujasite, and sufficient water to shape said mixture, forming said reaction mixture into a shape, and maintaining said reaction mixture at a temperature up to about 130° C. under crystallization conditions and in the absence of an added external liquid phase for sufficient time to form crystals of the Y-type faujasite.

The Y-type faujasite prepared in accordance with this invention has an X-ray diffraction pattern, after it has been calcined, containing the lines of Table I.

It is important, in preparing the reaction mixture of the present process, that the amount of water present in the reaction mixture as prepared for the crystallization step be sufficient to produce the Y-type faujasite. Thus, the reaction mixture itself furnishes all the water needed to crystallize the zeolite. This amount of water is less than the amount of water required in conventional processes for preparing zeolites. It is an amount which is not substantially greater than that required to produce the Y-type faujasite. For example, the amount of water used in the present invention is less than that required to dissolve the reaction mixture components, or, if they are not dissolved, less than that required to immerse the reaction mixture components in the water. Thus, during the crystallization step according to the present process, there is no separate, added external liquid phase present which must be removed from the crystallized material at the end of the crystallization step by, for example filtering or decanting, prior to drying the crystals. This absence of an added external liquid phase distinguishes the present invention from methods for making Y-type faujasite wherein the Y-type faujasite crystals are formed from solution or where solid reactants are heated in an aqueous solution until crystals of Y-type faujasite form.

While it is not a requirement to form the mixture into a shape before the mixture is subjected to crystallization conditions, it may be desired in many cases to do so. In that case, the amount of water present in the reaction mixture is sufficient to form the reaction mixture into a shape, but insufficient to cause the shaped reaction mixture to collapse or "melt", i.e., once the reaction mixture is formed into the desired shape containing the desired amount of water, the resulting shape is self-supporting.

Among other factors, the present invention is based on the discovery of a method for crystallizing the Y-type faujasite from a reaction mixture which contains an organic template capable of producing the Y-type faujasite and which contains only enough water to form the Y-type faujasite. The Y-type faujasite produced by this method has a silica to alumina mole ratio of greater than 6. Further, the Y-type faujasite prepared by the above described method is made as very small crystallites.

DETAILED DESCRIPTION OF THE INVENTION

Preparing the Reaction Mixture

The reaction mixture from which and in which the Y-type faujasite is crystallized comprises at least one active source of silica, at least one active source of alumina, and sufficient water to form the Y-type faujasite. This amount of water is considerably less than that required in conventional processes for preparing the Y-type faujasite.

The amount of water required in the reaction mixture of the present invention is that amount which is needed to adequately blend the mixture. Thus, a reaction mixture is prepared by mixing water with active sources of the zeolite to form a uniform mass having preferably a heavy paste-like consistency. The active sources will be in a form which can be easily blended into a uniform mass, and may be, for example, powders, hydrated particles, or concentrated aqueous solutions. Sufficient water is added to wet all the powders during the mixing and kneading steps. Alternatively, sufficient water is added that the powders may be kneaded into a uniform and generally homogeneous mixture which may be shaped. It is not necessary that all of the active sources be readily soluble in water during kneading, since the water added to the active sources will be insufficient to make a fluid-like mixture. The amount of water added depends on the mixing apparatus and on the active sources employed. Those familiar with the art can readily determine without undue experimentation the amount of liquid required to properly mix active sources of the zeolite. For example, hydrated sources of the zeolite may require relatively less water, and dried sources may require relatively more. Though it is preferred that the mixture be blended and kneaded until the mixture has a uniform, homogeneous appearance, the length of time devoted to kneading the mixture is not critical in the present invention.

The water content of the reaction mixture after blending and kneading may be further adjusted, for example, by drying or by the addition of water. When it desired that the reaction mixture be formed into a shape, adjusting the amount of water can facilitate shaping the reaction mixture and ensure that it will be self-supporting, i.e., the shape will not collapse or "melt" due to an excess of water in the reaction mixture.

Typical sources of silicon oxide ($SiO_2$) include silicates, silica hydrogel, silicic acid, colloidal silica, fumed silica, tetraalkyl orthosilicates silica hydroxides, precipitated silica and clays. Typical sources of aluminum oxide ($Al_2O_3$) include aluminates, alumina, and aluminum compounds such as $AlCl_3$, $Al_2(SO_4)_3$, aluminum hydroxide ($Al(OH_3)$), and kaolin clays. One advantage of the present invention is that the sources of silicon oxide and aluminum oxide can all be non-zeolitic.

Salts, particularly alkali metal halides such as sodium chloride, can be added to or formed in the reaction mixture. They are disclosed in the literature as aiding the crystallization of zeolites while preventing silica occlusion in the lattice.

The reaction mixture also contains one or more active sources of alkali metal oxide. Sources of lithium, sodium and potassium, are preferred. Any alkali metal compound which is not detrimental to the crystallization process is suitable here. Non-limiting examples include oxides, hydroxides, nitrates, sulfates, halogenides, oxalates, citrates and acetates. The alkali metal is generally employed in an amount so that the alkali metal/aluminum ratio is at least 1/1, preferably greater than 1/1.

The reaction mixture also contains an organic templating agent capable of producing Y-type faujasite. These organic templating agents are typically quaternary ammonium cations such as tetraethylammonium, tetrapropylammonium, or tetrabutylammonium cations. Tetraethyl ammonium compounds are the preferred organic template. The counter ion for the quaternary ammonium compounds may be essentially any anion such as halide or hydroxide which is not detrimental to the formation of the Y-type faujasite. As used herein, "halide" refers to the halogen anions, particularly fluorine, chlorine, bromine, iodine, and combinations thereof. Thus, representative anions include hydroxide, acetate, sulfate, carboxylate, tetrafluoroborate, and halides such as fluoride, chloride, bromide, and iodide. Hydroxide and iodide are particularly preferred as anions.

The organic templating agent is used in an amount which is sufficient to produce the Y-type faujasite.

The reaction mixture should contain the following components in the amounts indicated (expressed as mole ratios of oxides even though the actual starting materials may not be oxides):

|  | General | Preferred |
| --- | --- | --- |
| $SiO_2/Al_2O_3 =$ | 6–15 | 6–12 |
| $M^+/SiO_2 =$ | 0.2–1.0 | 0.3–0.7 |
| $OH^-/SiO_2 =$ | 0.1–0.5 | 0.2–0.4 |
| $R/SiO_2 =$ | 0.05–0.5 | 0.1–0.4 |
| $H_2O/SiO_2 =$ | 1–5 | 2–5 | wherein $M^+$ is an alkali metal cation and R is the organic templating agent.

Forming the Shapes

One advantage of the present invention is that the reaction mixture may be formed into a desired shape before the crystallization step, thereby reducing the number of process steps required to prepare catalytic materials containing the resulting zeolite. Prior to forming the reaction mixture, it may be necessary to change the liquid content of the reaction mixture, either by drying or by adding more liquid, in order to provide a formable mass which retains its shape. In general, for most shaping methods, water will generally comprise from about 20 percent to about 60 percent by weight, and preferably from about 30 percent to about 50 percent by weight of the reaction mixture.

The reaction mixture is formed into a shape, e.g., particles. Methods for preparing such shapes are well known in the art, and include, for example, extrusion, spray drying, granulation, agglomerization and the like. When the shape is in the form of particles, they are preferably of a size and shape desired for the ultimate catalyst, and may be in the form of, for example, extrudates, cylinders, spheres, granules, agglomerates and prills. The particles will generally have a cross sectional diameter between about 1/64 inch and about 1/2 inch, and preferably between about 1/32 inch and about 1/4 inch, i.e., the particles will be of a size to be retained on a 1/64 inch, and preferably on a 1/32 inch screen and will pass through a 1/2 inch, and preferably through a 1/4 inch screen.

The shape prepared from the reaction mixture will contain sufficient water to retain a desired shape. Additional water is not required in the mixture in order to initiate or maintain crystallization within the shaped reaction mixture. Indeed, it may be preferable to remove some of the excess water from the shaped reaction mixture prior to crystallization. Conventional methods for drying wet solids can be used to dry the reaction mixture, and may include, for example drying in air or an inert gas such as nitrogen or helium at temperatures below about 200° C. and at pressures from subatmospheric to about 5 atmospheres pressure.

Naturally occurring clays, e.g., bentonite, kaolin, montmorillonite, sepiolite and attapulgite, are not required, but may be included in the reaction mixture prior to crystallization to provide a product having good crush strength. Such clays can be used in the raw state as originally mined or can be initially subjected to calcination, acid treatment or chemical modification. Microcrystalline cellulose has also been found to improve the physical properties of the particles.

Zeolite Crystallization

According to the present process, the zeolite is crystallized either within the reaction mixture or within the shape made from the reaction mixture. In either case, the composition of the mixture from which the zeolite is crystallized has the molar composition ranges stated above.

It is preferred that the total volatiles content of the reaction mixture during crystallization be in the range of between about 20 wt. % and about 60 wt. %, and preferably between about 30 wt. % and about 60 wt. %, based on the weight of the reaction mixture, where the total volatiles content is the measure of total volatile liquid, including water, in the reaction mixture. It is a feature of the present process that no additional liquid beyond that required to produce the Y-type faujasite is required for zeolite crystallization.

Crystallization of the zeolite takes place in the absence of an added external liquid phase, i.e., in the absence of a liquid phase separate from the reaction mixture. In general, it is not detrimental to the present process if some liquid water is present in contact with the reaction mixture during crystallization, and it can be expected that some water may be on the surface of the reaction mixture during crystallization, or that some water may be expelled from the reaction mixture and may collect on or near the reaction mixture as the reaction progresses. However, it is an objective of the present invention to provide a method of crystallizing the zeolite in such a way as to minimize the amount of water which must be treated and/or discarded following crystallization. To that end, the present method provides a zeolite synthesis method which requires no additional water for crystallization beyond a sufficient amount of liquid required to form the Y-type faujasite.

Once the reaction mixture has been formed it is preferably "aged" before the Y-type faujasite is crystallized. This aging is accomplished by maintaining the reaction mixture at a relatively low temperature (compared to the crystallization temperature) under conditions which will prevent dehydration of the reaction mixture (such as placing the mixture in a sealed container and/or exposing it to a small amount of water vapor). Thus, the reaction mixture is maintained at room temperature or a slightly higher temperature. Typically, the temperature at which the mixture is aged will be from about 25° C. to about 75 C., preferably from about 25° C. to about 50° C. This temperature should be maintained for a time sufficient to provide the crystalline Y-type faujasite following the crystallization step. It is believed it is within the skill of one skilled in this art to readily determine the length of this aging step without undue experimentation. In general, the aging should be continued long enough to allow Y-type faujasite nuclei to begin to form in the reaction mixture. Typically, though, the aging step will be at least 24 hours, preferably 2 days or longer (e.g., 2–4 days), with longer aging times leading to a more crystalline product.

Crystallization is conducted after the aging step at an elevated temperature and usually in an autoclave so that the reaction mixture is subject to autogenous pressure until the crystals of zeolite are formed. The temperatures during the hydrothermal crystallization step are typically maintained from about 70° C. to about 130° C., preferably from about 80° C. to about 120° C. If the crystallization temperature is too high, the resulting product may be zeolite beta, not Y-type faujasite.

The crystallization is conducted under conditions which will prevent dehydration of the reaction mixture. This may be accomplished by exposing the reaction mixture to a small amount of water vapor or steam during crystallization.

It is believed it is well within the skill of one skilled in this art to determine a satisfactory crystallization time without undue experimentation. The crystallization time required to form crystals will typically range from about 1 day to about 10 days, and more frequently from about 1 day to about 4 days. If the crystallization period is too long, the zeolite formed will be zeolite Beta, not Y-type faujasite.

It has been found that the best product was obtained by a combination of aging and crystallization conditions comprising 1 day at room temperature, followed by 1 day at 45° C., followed by 39 hours at 100° C.

In the present method, the crystallized material collected following the crystallization step will typically comprise at least about 50 weight percent crystals. Crystallized material containing at least about 80 weight percent crystals, and even at least about 90 weight percent crystals, may also be prepared using the present method.

Once the zeolite crystals have formed, the crystals may be water-washed and then dried, e.g., at 90° C. to 150° C. for from 8 to 24 hours. The drying step can be performed at atmospheric or subatmospheric pressures.

Seed Crystals

The zeolite made by the present process is crystallized within the reaction mixture, which comprises amorphous reagents. Crystalline material (i.e., "seed" crystals of Y-type faujasite) may be added to the mixture prior to the crystallization step, and methods for enhancing the crystallization of zeolites by adding "seed" crystals are well known. However, the addition of seed crystals is not a requirement of the present process. Indeed, it is an important feature of the present process that the zeolite can be crystallized within the reaction mixture in the absence of crystals added prior to the crystallization step.

DESCRIPTION OF THE Y-TYPE FAUJASITE

The Y-type faujasite prepared in accordance with this invention and calcined is characterized by the X-ray diffraction lines in Table I below. In Table I, d is the distance between two lattice planes, and $I/I_o$ is the ratio, expressed in percent, of the intensity of any given line (I) to the intensity of the most intense line ($I_o$). The strongest line is assigned a value of 100. In Table I, the intensities are indicated as W (weak—less than 20), M (medium—20–40), S (strong—40–60) and VS (very strong—greater than 60). In Table IA, actual relative intensities are shown. Of course, distances as well as relative intensities may be subject to small variations according to the product analyzed. Such variations do not indicate a change of structure but are due to the replacement of certain cations or to a deviation in the silica/alumina ratio.

TABLE I

| 2 Theta | d (Å) | $I/I_o$ |
|---|---|---|
| 5.87 | 15.05 | S |
| 6.14 | 14.38 | VS |
| 10.08 | 8.77 | M |
| 11.83 | 7.47 | M |
| 15.58 | 5.68 | VS |
| 18.63 | 4.76 | M |
| 20.31 | 4.37 | S |
| 22.78 | 3.90 | W |
| 23.58 | 3.77 | VS |
| 27.01 | 3.29 | S |
| 29.60 | 3.02 | W |
| 30.73 | 2.91 | M |
| 31.37 | 2.85 | M |

TABLE IA

| 2 Theta | d (Å) | $I/I_o$ |
|---|---|---|
| 5.87 | 15.05 | 57 |
| 6.14 | 14.38 | 100 |
| 10.08 | 8.77 | 37 |
| 11.83 | 7.47 | 38 |
| 15.58 | 5.68 | 67 |
| 18.63 | 4.76 | 24 |
| 20.31 | 4.37 | 46 |
| 22.78 | 3.90 | 16 |
| 23.58 | 3.77 | 72 |
| 27.01 | 3.29 | 55 |
| 29.60 | 3.02 | 15 |
| 30.73 | 2.91 | 25 |
| 31.37 | 2.85 | 55 |

The Y-type faujasite produced by the present invention typically has a silica/alumina mole ratio of greater than 6, preferably from greater than 6 to about 15, more preferably from greater than 6 to about 10. The silica/alumina mole ratio of the product zeolite can be determined from a corelation with the unit cell constant as calculated from X-ray diffraction analysis (see Sohn et al., Zeolites, 6, 225 (86)). The Y-type faujasites produced by the present application include zeolites such as ZSM-20, ECR-32 and ECR-35.

Zeolite Crystallite Size

Typically, the zeolite crystals are less than 10 microns in diameter as determined by Scanning Electron Microscopy. Since small crystals are desirable for certain catalytic applications, crystallization conditions can be tailored to produce zeolite crystals with diameters of less than 1.0 micron. The crystal size of the zeolite may be determined by, for example, grinding the shaped particles to separate the individual crystals. High resolution electron micrographs of the separated crystals can then be prepared, after which the average size of individual zeolite crystals can be determined by reference to calibrated length standards. An average crystal size may then be computed in various well-known ways, including:

$$\text{Number Average} = \frac{\sum\limits_{i=1}^{n} (n_i \times L_i)}{\sum\limits_{i=1}^{n} n_i}$$

where $n_i$ is the number of zeolite crystals where minimum length falls within an interval $L_i$. For purposes of this invention, average crystal size will be defined as a number average. It is important to note that for purposes of this invention, zeolite crystal size is distinguished from what some manufacturers term "zeolite particle size," the latter being the average size of all particles, including both individual crystals and polycrystalline agglomerates, in the as-produced zeolite powder.

Typically, the zeolite crystals are less than 10 microns in diameter as determined by Scanning Electron Microscopy. Since small crystals are desirable for certain catalytic applications, crystallization conditions can be tailored by, for example, reducing crystallization temperature, by increasing aluminum content in the reaction mixture, and/or by reducing the water content of the reaction mixture or the shaped particles prior to crystallization, to produce zeolite crystals with diameters of less than 1.0 micron.

Zeolite Post-Treatment

A crystallized material containing crystals of zeolite is prepared in the process as described above. The zeolite can be used as synthesized or can be thermally treated (calcined). In some cases, the synthesis product can contain silica which is not incorporated in the zeolite structure. This excess silica can be removed by washing with dilute acid (e.g., 0.2M $HNO_3$) or dilute base (e.g., 0.01M $NH_4OH$). This washing should be done prior to thermal treatment of the zeolite. Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica/alumina mole ratio. These methods may also include the use of $(NH_4)_2SiF_6$ or acidic ion-exchange resin treatment. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation/dehydrogenation function is desired. Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Ga, Cd, Pt, Pd, Ni, Co, Ti, Al, Sn, Fe and Co are particularly preferred.

The hydrogen, ammonium, and metal components can be exchanged into the zeolite. The zeolite can also be impregnated with the metals, or, the metals can be physically intimately admixed with the zeolite using standard methods known to the art. The metals can also be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The zeolite may be used as a catalyst, without additional forming, if the reaction mixture has been formed into a shape which is of a size and shape desired for the ultimate catalyst. Alternatively, the zeolite can be composited with other materials resistant to the temperatures and other conditions employed in organic conversion processes, using techniques such as spray drying, extrusion, and the like. Such matrix materials include active and inactive materials and synthetic or naturally occurring zeolites as well as inorganic materials such as clays, silica and metal oxides. The latter may occur naturally or may be in the form of gelatinous precipitates, sols, or gels, including mixtures of silica and metal oxides. Use of an active material in conjunction with the synthetic zeolite, i.e., combined with it, tends to improve the conversion and selectivity of the catalyst in certain organic conversion processes. Inactive materials can suitably serve as diluents to control the amount of conversion in a given process so that products can be obtained economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in petroleum refining the catalyst is often subjected to rough handling. This tends to break the catalyst down into powders which cause problems in processing.

Naturally occurring clays which can be composited with the synthetic zeolite of this invention include the montmorillonite and kaolin families, which families include the sub-bentonites and kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be initially subjected to calcination, acid treatment or chemical modification.

In addition to the foregoing materials, the zeolite prepared by the present method can be composited with porous matrix materials and mixtures of matrix materials such as silica, alumina, titania, magnesia, silica-alumina, silica-magnesia, silica-zirconia, silica-thoria, silica-beryllia, silica titania, titania-zirconia as well as ternary compositions such as silica-alumina-thoria, silica-alumina-zirconia, silica-alma-magnesia and silica-magnesia-zirconia. The matrix can be in the form of a cogel.

The zeolite can also be composited with other zeolites such as synthetic and natural faujasites (e.g., X), and erionites. They can also be composited with purely synthetic zeolites such as those of the ZSM, SSZ, KU, FU, and NU series. The combination of zeolites can also be composited in a porous inorganic matrix.

The zeolite prepared in the present process is useful in hydrocarbon conversion reactions. Hydrocarbon conversion reactions are chemical and catalytic processes in which carbon containing compounds are changed to different carbon containing compounds. Examples of hydrocarbon conversion reactions include isomerization of $C_5$ and $C_6$ compounds to increase the octane of gasoline, hydrocracking, fluid catalytic cracking, butane alkylation for fuels, aromatics alkylation, aromatics isomerization and olefin polymerization.

EXAMPLES

Example 1

150 Grams of silica (Hi-Sil 233, a hydrated silica manufacture by PPG) was placed in a Baker-Perkins mixer. 50 Grams of $NaAlO_2$ was added to the mixer and the two were mixed for about ten minutes. Then 19 grams of a 50% NaOH aqueous solution and 190 grams of a 35% tetraethylammonium hydroxide solution was slowly added to the mixer and mixing continued for about 3 hours. Deionized water (40 grams) was then added slowly to the mixer to form a paste-like mixture. Heat (66° C.) was applied to the mixture to dry it slightly (to about 50% volatiles) and make it extrudable, and the mixture was stored overnight at room temperature in a sealed container.

The mixture was extruded and the extrudates divided into four parts (A, B, C and D). Parts A and B contained 49.3% volatiles, and parts C and D were air dried to 45% volatiles.

Each of parts A, B, C and D was placed in its own one quart Teflon bottle with a hole in the cover, and each bottle was sealed in an autoclave which contained 12 cc water outside the bottles to prevent drying of the samples when heated (especially small samples in large autoclaves). At the end of crystallization, there was still about 12 cc water outside the bottles, so consumption of this water was negligible. The bottles were then left at room temperature for 24 hours. The bottles containing parts A and C were then heated at 110° C. for two days, and the bottles containing parts B and D were heated at 110° C. for four days.

The resulting crystalline extrudates were washed with deionized water, filtered, dried in a vacuum oven at 120° C. overnight and calcined for 6 hours at 593° C. The products were analyzed by X-ray diffraction and determined to be the Y-type faujasite of this invention. The XRD lines for part B are indicated in Table II below.

TABLE II

| 2 Theta | d (Å) | I/I$_o$ |
|---|---|---|
| 2.59 | 34.08 | 6.13 |
| 3.18 | 27.76 | 3.69 |
| 4.17 | 21.17 | 3.27 |
| 5.87 | 15.05 | 56.67 |
| 6.14 | 14.38 | 100.00 |
| 6.55 | 13.48 | 11.01 |
| 7.40 | 11.93 | 5.66 |
| 7.75 | 11.40 | 2.15 |
| 10.08 | 8.77 | 37.37 |
| 11.83 | 7.47 | 37.52 |
| 13.43 | 6.59 | 7.00 |
| 14.82 | 5.98 | 3.10 |
| 15.58 | 5.68 | 67.16 |
| 18.24 | 4.86 | 4.24 |
| 18.63 | 4.76 | 23.71 |
| 20.32 | 4.37 | 45.69 |
| 21.66 | 4.10 | 5.00 |
| 22.78 | 3.90 | 15.87 |
| 23.58 | 3.77 | 71.59 |
| 24.92 | 3.57 | 5.32 |
| 25.75 | 3.46 | 8.47 |
| 27.01 | 3.30 | 55.15 |
| 27.73 | 3.21 | 6.62 |
| 29.60 | 3.02 | 15.25 |
| 30.73 | 2.91 | 25.28 |
| 31.37 | 2.85 | 54.74 |
| 32.43 | 2.76 | 13.83 |
| 33.09 | 2.70 | 8.14 |
| 34.07 | 2.63 | 13.77 |
| 34.59 | 2.59 | 7.90 |
| 35.62 | 2.52 | 2.97 |
| 37.13 | 2.42 | 3.68 |
| 37.90 | 2.37 | 12.04 |
| 41.42 | 2.18 | 5.61 |
| 41.86 | 2.16 | 2.90 |

Example 2

150 Grams of silica (Hi-Sil 233, a hydrated silica manufacture by PPG) was placed in a Baker-Perkins mixer. 50 Grams of $NaAlO_2$ was added to the mixer and the two were mixed for about ten minutes. Then 19 grams of a 50% NaOH solution and 190 grams of a 35% tetraethylammonium hydroxide solution was slowly added to the mixer and mixing continued for about 3 hours.

About one half of the mixture was removed from the mixer (volatiles content 53.63%) and divided into parts A and B and stored at room temperature for 24 hours. The half of the mixture remaining in the mixer was mixed while adding 25 grams of deionized water to achieve a paste-like consistency. Heat (about 66° C.) was applied to the mixture until a volatiles content of about 50% was achieved. This mixture was then sealed in a container and let stand at room temperature overnight. This mixture was not extrudable, and was divided into parts C and D and crystallized as it was (dry powder form).

Parts A and B were extruded and each of parts A, B, C and D was placed in its own one quart Teflon bottle with a hole in the cover, and each bottle was sealed in an autoclave which contained 12 cc water outside the bottles. The bottles were then left at room temperature for 24 hours. The bottles containing parts A and C were then heated at 110° C. for two days, and the bottles containing parts B and D were heated at 110° C. for four days.

One half of each of the resulting crystalline products was washed with deionized water, and the other half washed with a 10% $NH_4NO_3$ solution containing 0.6 cc HNO3 per 100 grams of solution. The products were dried in a vacuum oven at 120° C. overnight and calcined for 6 hours at 593° C. The products were analyzed by X-ray diffraction and determined to be the Y-type faujasite of this invention. The X-ray diffraction lines for part D are indicated in Table III below.

TABLE III

| 2 Theta | d (Å) | I/I₀ |
|---|---|---|
| 3.37 | 26.21 | 3.63 |
| 3.69 | 23.90 | 5.65 |
| 5.18 | 17.04 | 4.22 |
| 5.85 | 15.10 | 51.97 |
| 6.14 | 14.37 | 100.00 |
| 7.50 | 11.77 | 5.04 |
| 10.10 | 8.76 | 37.49 |
| 11.84 | 7.47 | 34.39 |
| 13.41 | 6.60 | 30.53 |
| 15.60 | 5.68 | 59.25 |
| 16.76 | 5.29 | 4.26 |
| 17.52 | 5.06 | 5.15 |
| 18.65 | 4.76 | 29.00 |
| 19.60 | 4.53 | 5.53 |
| 20.33 | 4.37 | 43.03 |
| 21.30 | 4.17 | 12.26 |
| 22.36 | 3.97 | 13.92 |
| 22.42 | 3.96 | 15.66 |
| 22.91 | 3.88 | 34.08 |
| 23.61 | 3.77 | 69.5 |
| 24.56 | 3.62 | 3.07 |
| 24.94 | 3.57 | 7.05 |
| 25.76 | 3.45 | 12.82 |
| 27.03 | 3.30 | 56.45 |
| 27.73 | 3.21 | 8.93 |
| 28.51 | 3.13 | 5.28 |
| 29.62 | 3.01 | 31.92 |
| 30.76 | 2.91 | 34.09 |
| 31.38 | 2.85 | 52.12 |
| 32.45 | 2.76 | 13.09 |
| 33.05 | 2.71 | 8.61 |
| 34.10 | 2.63 | 12.19 |
| 34.56 | 2.59 | 9.22 |
| 35.13 | 2.55 | 6.51 |
| 37.89 | 2.37 | 11.12 |
| 40.00 | 2.25 | 3.85 |
| 40.58 | 2.22 | 2.14 |
| 41.03 | 2.20 | 5.95 |
| 41.43 | 2.18 | 9.61 |

Example 3

600 Grams of silica (Hi-Sil 233, a hydrated silica manufacture by PPG) was placed in a Baker-Perkins mixer. 200 Grams of NaAlO₂ was added to the mixer and the two were mixed for about ten minutes. Then 76 grams of a 50% NaOH solution and 760 grams of a 35% tetraethylammonium hydroxide solution was slowly added to the mixer and mixing continued for about 3 hours. Then 50 grams of deionized water was added and mixing continued until the mixture reached a paste-like consistency.

Heat (about 66° C.) was applied to the mixture until a volatiles content of about 50% was achieved. This mixture was then sealed in a container and let stand at room temperature overnight. The mixture was heated again until the volatiles content was 48%.

The resulting mixture was divided into six parts (A–F) which were aged and crystallized as follows:

| Part | Aging | Crystallization |
|---|---|---|
| A | 1 day at room temp. | 4 days at 110° C. |
| B | 1 day at room temp. | 7 days at 110° C. |
| C | 2 days at room temp. | 4 days at 110° C. |
| D | 2 days at room temp. | 7 days at 110° C. |
| E | 1 day at 45° C. | 4 days at 110° C. |
| F | 1 day at 45° C. | 7 days at 110° C. |

Each of parts A–F was placed in its own one quart Teflon bottle with a hole in the cover, and each bottle was sealed in an autoclave which contained 12 cc water outside the bottles. The bottles were aged in the autoclave for the time and at the temperature indicated above, except for parts A and B where aging started at the end of the first day.

The resulting crystalline products were washed with an acid solution containing 0.6 cc HNO₃ per 100 grams of solution. The products were dried in a vacuum oven at 120° C. overnight and calcined for 6 hours at 593° C. The products were analyzed by X-ray diffraction and determined to be the Y-type faujasite of this invention. The X-ray diffraction lines for part E are shown in Table IV below.

TABLE IV

| 2 Theta | d (Å) | I/I₀ |
|---|---|---|
| 2.06 | 42.90 | 5.49 |
| 3.02 | 29.26 | 7.33 |
| 3.30 | 26.75 | 3.01 |
| 5.99 | 14.74 | 56.44 |
| 6.24 | 14.16 | 100.00 |
| 7.39 | 11.96 | 7.89 |
| 10.20 | 8.67 | 31.07 |
| 11.04 | 8.01 | 11.85 |
| 11.93 | 7.41 | 29.54 |
| 12.95 | 6.83 | 7.04 |
| 15.68 | 5.65 | 63.31 |
| 17.00 | 5.21 | 4.42 |
| 17.26 | 5.13 | 3.47 |
| 18.75 | 4.73 | 28.64 |
| 20.43 | 4.34 | 54.19 |
| 21.41 | 4.15 | 6.01 |
| 22.53 | 3.93 | 15.15 |
| 22.82 | 3.89 | 16.21 |
| 23.32 | 3.81 | 19.79 |
| 23.71 | 3.75 | 61.73 |
| 25.06 | 3.55 | 7.45 |
| 25.86 | 3.44 | 14.67 |
| 27.13 | 3.28 | 60.45 |
| 27.86 | 3.20 | 10.09 |
| 28.73 | 3.11 | 5.81 |
| 28.96 | 3.08 | 4.43 |
| 29.73 | 3.00 | 13.45 |
| 30.86 | 2.90 | 32.24 |
| 31.47 | 2.84 | 57.08 |
| 32.22 | 2.78 | 5.40 |
| 32.57 | 2.75 | 20.03 |
| 33.23 | 2.69 | 6.91 |
| 34.20 | 2.62 | 13.25 |
| 37.27 | 2.41 | 5.30 |
| 37.99 | 2.37 | 14.38 |
| 39.26 | 2.29 | 5.91 |
| 41.53 | 2.17 | 8.76 |

What is claimed is:

1. A method for preparing crystalline Y-type faujasite, said method comprising:
   (A) preparing a reaction mixture comprising at least one active source of silica, at least one active source of alumina, and an organic templating agent capable of producing the Y-type faujasite in amounts sufficient to produce the Y-type faujasite, and sufficient water to produce the Y-type faujasite; and
   (B) maintaining said reaction mixture at a temperature up to about 130° C. under crystallization conditions and in the absence of an added external liquid phase for sufficient time to form crystals of the Y-type faujasite.

2. The method according to claim 1 wherein said reaction mixture has a water/silica molar ratio during crystallization of no greater than about 6.

3. The method of claim 2 wherein said reaction mixture during crystallization has a water/silica molar ratio between about 2 and about 5.

4. The method according to claim 1 wherein said reaction mixture has the following molar composition ranges:

$SiO_2/Al_2O_3$=6–15
$M^+/SiO_2$=0.2–1.0
$OH^-/SiO_2$=0.1–0.5
$R/SiO_2$=0.05–0.5
$H_2O/SiO_2$=1–5 wherein $M^+$ is an alkali metal cation and R is the organic templating agent.

5. The method according to claim 4 wherein said reaction mixture has the following molar composition ranges:

$SiO_2/Al_2O_3$=6–12
$M^+/SiO_2$=0.3–0.7
$OH^-/SiO_2$=0.2–0.4
$R/SiO_2$=0.1–0.4
$H_2O/SiO_2$=2–5 wherein $M^+$ is an alkali metal cation and R is the organic templating agent.

6. The method according to claim 1 wherein the silica/alumina mole ratio is about 6 to about 15.

7. The according to claim 6 wherein the silica/alumina mole ratio is about 6 to about 12.

8. The method according to claim 1 wherein said reaction mixture further comprises at least one active source of a Group VIII metal.

9. The method according to claim 8 wherein said Group VIII metal is selected from platinum, palladium and a combination thereof.

10. The method according to claim 1 wherein the silica/alumina mole ratio in the Y-type faujasite product is greater than 6.

11. The method according to claim 1 wherein the silica/alumina mole ratio in the Y-type faujasite product is from greater than 6 to about 15.

12. The method according to claim 1 wherein the Y-type faujasite has, after calcination, an X-ray diffraction pattern containing the lines of Table I.

13. The method according to claim 1 wherein, after the reaction mixture has been prepared, and prior to step B, the reaction mixture is maintained at a temperature from about 25° C. to about 75° C. in the absence of an added external liquid phase.

14. A method for preparing crystalline Y-type faujasite, said method comprising:

(A) preparing a reaction mixture comprising at least one active source of silica, at least one active source of alumina, and an organic templating agent capable of producing the Y-type faujasite in amounts sufficient to produce the Y-type faujasite, and sufficient water to shape said mixture;

(B) forming said reaction mixture into a shape; and (C) maintaining said reaction mixture at a temperature up to about 130° C. under crystallization conditions and in the absence of an added external liquid phase for sufficient time to form crystals of the Y-type faujasite.

15. The method according to claim 14 wherein the mount of water is sufficient to make the reaction mixture self-supporting.

16. The method according to claim 14 wherein said reaction mixture has a water/silica molar ratio during crystallization of no greater than about 6.

17. The method of claim 16 wherein said reaction mixture during crystallization has a water/silica molar ratio between about 2 and about 5.

18. The method according to claim 14 wherein said reaction mixture has the following molar composition ranges:

$SiO_2/Al_2O_3$=6–15
$M^+/SiO_2$=0.2–1.0
$OH^-/SiO_2$=0.1–0.5
$R/SiO_2$=0.05–0.5
$H_2O/SiO_2$=1–5 wherein $M^+$ is an alkali metal cation and R is the organic templating agent.

19. The method according to claim 18 wherein said reaction mixture has the following molar composition ranges:

$SiO_2/Al_2O_3$=6–12
$M^+/SiO_2$=0.3–0.7
$OH^-/SiO_2$=0.2–0.4
$R/SiO_2$=0.1–0.4
$H_2O/SiO_2$=2–5 wherein $M^+$ is an alkali metal cation and R is the organic templating agent.

20. The method according to claim 14 wherein the silica/alumina mole ratio is from about 6 to about 15.

21. The according to claim 20 wherein the silica/alumina mole ratio is from about 6 to about 12.

22. The method according to claim 14 wherein said reaction mixture further comprises at least one active source of a Group VIII metal.

23. The method according to claim 22 wherein said Group VIII metal is selected from platinum, palladium and a combination thereof.

24. The method according to claim 14 wherein the shaped crystalline zeolite is a spherical or cylindrical particle having a cross sectional diameter between about 1/64 inch and about ½ inch.

25. The method according to claim 24 wherein the shaped crystalline zeolite is a spherical or cylindrical particle having a cross sectional diameter between about 1/32 inch and about ¼ inch in diameter.

26. The method according to claim 14 wherein the silica/alumina mole ratio in the Y-type faujasite product is greater than 6.

27. The method according to claim 14 wherein the silica/alumina mole ratio in the Y-type faujasite product is from greater than 6 to about 15.

28. The method according to claim 14 wherein the Y-type faujasite has, after calcination, an X-ray diffraction pattern containing the lines of Table I.

29. The method according to claim 14 wherein, after the reaction mixture has been prepared and prior to step B, the reaction mixture is maintained at a temperature from about 25° C. to about 75° C. in the absence of an added external liquid phase.

\* \* \* \* \*